United States Patent
Peddi et al.

(10) Patent No.: US 12,119,763 B2
(45) Date of Patent: Oct. 15, 2024

(54) HARMONIC CURRENT COMMAND WITH FOUR DEGREES OF FREEDOM FOR ELECTRIC MOTOR

(71) Applicant: GM GLOBAL TECHNOLOGY OPERATIONS LLC, Detroit, MI (US)

(72) Inventors: Vinod Chowdary Peddi, Shelby Township, MI (US); Cheng Gong, Troy, MI (US); Le Chang, Shelby Township, MI (US); Song He, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 182 days.

(21) Appl. No.: 17/979,215

(22) Filed: Nov. 2, 2022

(65) Prior Publication Data
US 2024/0154555 A1    May 9, 2024

(51) Int. Cl.
*H02P 21/22*    (2016.01)
*H02P 6/10*    (2006.01)
*H02P 29/50*    (2016.01)

(52) U.S. Cl.
CPC .............. *H02P 21/22* (2016.02); *H02P 6/10* (2013.01); *H02P 29/50* (2016.02)

(58) Field of Classification Search
CPC .................................. H02P 29/50; H02P 6/10
See application file for complete search history.

(56) References Cited

U.S. PATENT DOCUMENTS

| | | | | |
|---|---|---|---|---|
| 7,982,326 B2* | 7/2011 | Tan | ......................... | H02P 29/50 290/44 |
| 2011/0204833 A1* | 8/2011 | Santo | ...................... | H02P 21/05 318/400.23 |
| 2014/0265961 A1* | 9/2014 | Gebregergis | ............ | H02P 21/05 318/400.23 |
| 2014/0265962 A1* | 9/2014 | Gebregergis | ............ | H02P 31/00 318/400.23 |
| 2020/0059182 A1* | 2/2020 | Watahiki | ................... | H02P 6/10 |
| 2023/0198438 A1* | 6/2023 | Matsuyama | ............ | H02P 21/22 318/400.02 |
| 2023/0291341 A1* | 9/2023 | Shimada | ................... | H02P 6/10 |

FOREIGN PATENT DOCUMENTS

JP    2011223772 A    * 11/2011

* cited by examiner

*Primary Examiner* — Bickey Dhakal
(74) *Attorney, Agent, or Firm* — Quinn IP Law (57) ABSTRACT

A propulsion system for a device includes an electric motor configured to generate torque to propel the device. A controller is in communication with the electric motor and is adapted to select at least one harmonic order for a harmonic current command. The controller is adapted to define a plurality of operating regions, including a first operating region, a second operating region and a third operating region, each associated with a respective objective function for generating the harmonic current command. The controller is adapted to operate the harmonic current command with four degrees of freedom by selectively varying a q-axis current magnitude, a d-axis current magnitude, a q-axis phase and a d-axis phase as a function of the torque and a motor speed.

17 Claims, 5 Drawing Sheets

HARMONIC CURRENT COMMAND WITH FOUR DEGREES OF FREEDOM FOR ELECTRIC MOTOR

INTRODUCTION

The disclosure relates generally to a propulsion system for a device having an electric motor. More specifically, the disclosure relates to a harmonic current command for the electric motor. The use of purely electric vehicles and hybrid vehicles, such as battery electric vehicles and fuel cell hybrid electric vehicles, has greatly increased over the last few years. Propulsion for the hybrid electric vehicles and other electric-powered transportation devices may be provided by electric motors. The performance of electric motor varies over time due to a number of factors. In many electric-powered transportation devices, it is challenging to minimize noise with consistent torque ripple while continuing to meet high torque demands.

SUMMARY

Disclosed herein is a propulsion system for a device having an electric motor. The electric motor is configured to generate torque to propel the device and defines a motor speed. A controller is in communication with the electric motor and has a processor and tangible, non-transitory memory on which instructions are recorded. The controller is adapted to select at least one harmonic order for a harmonic current command. The controller is adapted to define a plurality of operating regions, including a first operating region, a second operating region and a third operating region, each associated with a respective objective function for generating the harmonic current command. The controller is adapted to operate the harmonic current command with four degrees of freedom by selectively varying a q-axis current magnitude, a d-axis current magnitude, a q-axis phase and a d-axis phase as a function of the torque and the motor speed.

The respective objective function for the first operating region may be selected such that a harmonic current magnitude is minimized, the first operating region extending over a lower value torque region. The respective objective function for the second operating region may be selected such that a radial force density is minimized, the second operating region extending over an intermediate value torque region. The respective objective function for the third operating region may be selected such that the radial force density is minimized, and the harmonic current magnitude is partially constrained, the third operating region extending over a higher value torque region.

The radial force density is based in part on a radial flux density, a tangential flux density and a permeability constant of free space. The harmonic current magnitude is obtained as $\text{sqrt}(I_{d\_Hx}*I_{d\_Hx}+I_{q\_Hx}*I_{q\_Hx})$, with $I_{d\_Hx}$ denoting a d-axis current magnitude and $I_{q\_Hx}$ denoting a q-axis current magnitude. The harmonic current command has a d-axis component represented by $[I_{d_{Hx}}*\sin(Hx\theta_e+\phi_d)]$ and a q-axis component represented by $[I_{q\_Hx}*\cos(Hx\theta_e+\phi_q)]$, with $I_{d\_Hx}$ denoting the d-axis current magnitude, $I_{q\_Hx}$ denoting the q-axis current magnitude, $\phi_q$ denoting the q-axis phase, $\phi_d$ denoting the d-axis phase, Hx denoting the at least one harmonic order and $\theta_e$ denoting a motor position.

The controller is adapted to blend the harmonic current command for a first blended region between the first operating region and the second operating region. The controller is adapted to determine if a modulation index is less than a predefined threshold value prior to the harmonic current command, the modulation index being a ratio of a commanded voltage to an available DC link voltage. The harmonic order may include a first harmonic and a second harmonic.

Disclosed herein is a method of operating a propulsion system in a device, the propulsion system having an electric motor configured to generate torque, the electric motor defining a motor speed. The controller has a processor and tangible, non-transitory memory. The method includes selecting at least one harmonic order for a harmonic current command and defining a plurality of operating regions, which includes a first operating region, a second operating region and a third operating region each associated with a respective objective function for generating the harmonic current command; and operating the harmonic current command with four degrees of freedom by selectively varying a q-axis current magnitude, a d-axis current magnitude, a q-axis phase and a d-axis phase as a function of the torque and the motor speed.

The above features and advantages and other features and advantages of the present disclosure are readily apparent from the following detailed description of the best modes for carrying out the disclosure when taken in connection with the accompanying drawings.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Figure 1:
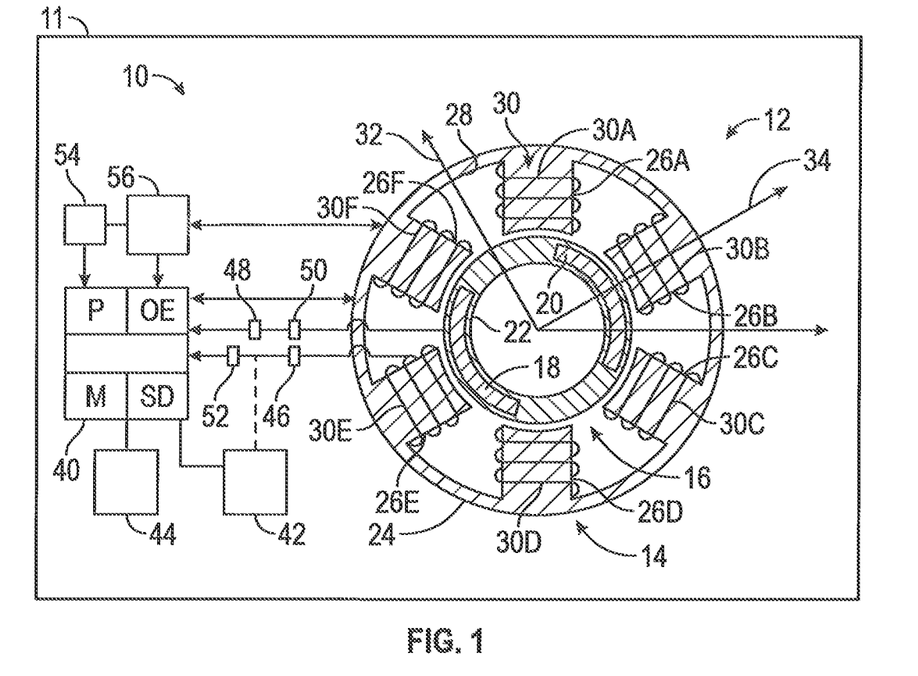
FIG. 1 is a schematic fragmentary partly sectional view of a propulsion system for a device having an electric motor and a controller.

Referring to the drawings, wherein like reference numbers refer to like components, FIG. 1 schematically illustrates a propulsion system 10 for a device 11. The device 11 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other device. The device 11 may take many different forms and include multiple and/or alternate components and facilities.

Referring to FIG. 1, the device 11 includes an electric motor 12 having a stator 14, and a rotor 16 which includes at least one permanent magnet. The rotor 16 may include a first permanent magnet 18 and a second permanent magnet 20 of alternating polarity around the outer periphery of a rotor core 22. The rotor 16 may include as many permanent magnets as required per the application; for simplicity two are shown. The rotor 16 defines an electrical speed or motor speed ($\omega_e$) and a mechanical frequency ($\omega_m$), which are related as ($\omega_e=(P/2)*\omega_m$), where P is the number of poles. While the embodiment shown in FIG. 1 illustrates a three-phase, single pole pair (i.e. two poles) machine, it is understood that the number of phases or pole pairs may be varied.

Referring to FIG. 1, the stator 14 includes a stator core 24 which may be cylindrically shaped with a hollow interior. The stator core 24 may include a plurality of inwardly protruding stator teeth 26A-F, separated by gaps or slots 28. In the embodiment shown in FIG. 1, stator windings 30 may be operatively connected to the stator core 24, such as for example, being coiled around the stator teeth 26A-F. The electric motor 12 may include, but is not limited to, synchronous machines. While an example electric motor 12 is shown, the components illustrated in the FIG. are not intended to be limiting. Indeed, additional or alternative components and/or implementations may be used.

The stator 14 is configured to have electric current, referred to herein as stator current, flowing in the stator windings 30 and causing a rotating magnetic field in the stator 14. Referring to FIG. 1, the stator windings 30 may include six sets of windings; one set for each of three phases (the first phase through stator windings 30A and 30D, the second phase through stator windings 30B and 30E and the third phase through stator windings 30C and 30F). Alternatively, slip rings or brushes (not shown) may be employed. Referring to FIG. 1, a quadrature magnetic axis 34 (referred to herein as q-axis) and a direct magnetic axis 32 (referred to herein as d-axis) are shown. The first and second permanent magnets 18, 20 aid in the creation of a magnetic field and magnet flux linkage.

Referring to FIG. 1, the propulsion system 10 includes a controller 40 in communication, such as electronic communication, with the electric motor 12. Referring to FIG. 1, the controller 40 may include an online torque estimation module OE and a stored data module SD. The electric motor 12 is configured to generate torque to propel the device 11, for example, through one or more wheels 42. The propulsion system 10 may include a secondary source 44, such as an internal combustion engine, configured to selectively provide a secondary torque contribution to propel the device 11, through the wheels 42, for example.

The electric motor 12 produces a torque signal in response to a torque command. The harmonics of the flux density in the electric motor 12 generate oscillating field forces at specific spatial orders, which cause vibration excitations resulting in torque ripple leading to acoustic noise. The vibrations are the result of magnetic flux density harmonics in the airgap of an electric motor. Electromagnetic forces in the air gap may be evaluated from the flux density as follows, using the Maxwells Stress Tensor:

$$\sigma = \sigma_{rad} + j\sigma_{tan} = \frac{B^2}{4\mu_0} \quad B = B_{rad} + jB_{tan} \quad (1)$$

$$\sigma_{rad} = \frac{B_{rad}^2 - B_{tan}^2}{2\mu_0} \quad \sigma_{tan} = \frac{B_{rad}B_{tan}}{\mu_0} \quad (4)$$

Here $\sigma_{rad}$ denotes radial force density, $\sigma_{tan}$ denotes tangential force density, $B_{rad}$ denotes radial flux density, $B_{tan}$ denotes tangential flux density and $\mu_0$ indicates permeability of free space. At high electrical speeds or frequencies, the radial forces are dominant and tangential forces may be ignored. The radial force density may be represented as:

$$\sigma_{rad} = \frac{B_{rad}^2}{2\mu_0} \quad (3)$$

The force oscillations may be compensated, an the acoustics improved, by injecting a harmonic current with the same d-axis and q-axis current magnitude and phase in a synchronous reference frame (two degrees of freedom). If a 6th order harmonic is employed, this leads to either a positive 7th order or negative 5th order injection in a stationary reference frame However, at peak torque and maximum current operation, this leads to a violation of global current limits for the electric motor 12 as well as inconsistent torque ripple minimization.

Figure 2:
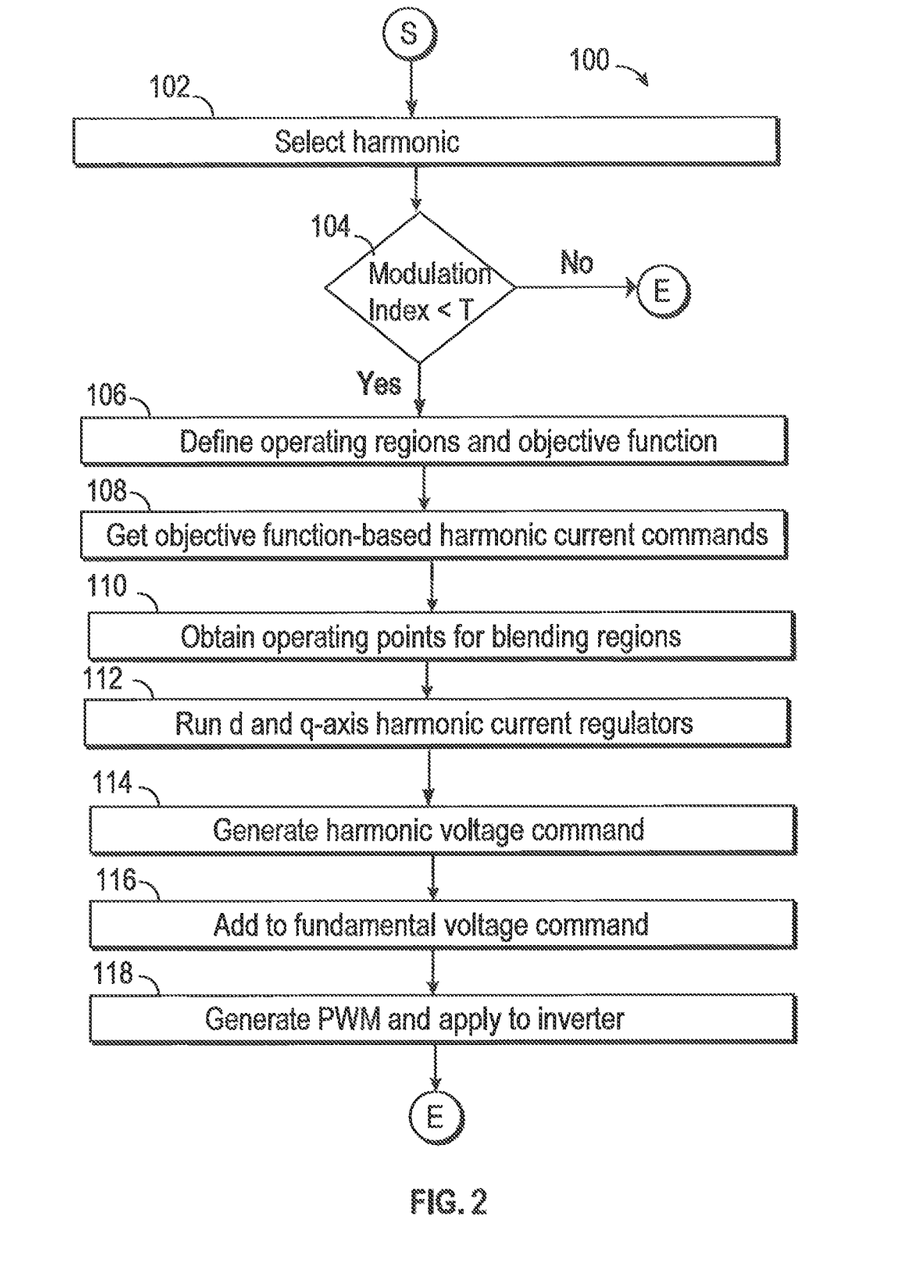
FIG. 2 is a flowchart for a method executable by the controller of FIG. 1.

The controller 40 includes at least one processor P and at least one memory M (or non-transitory, tangible computer readable storage medium) on which are recorded instructions for executing a method 100, shown in FIG. 2, for minimizing torque ripple and noise, vibration and harshness (NVH) in the electric motor 12 by varying the operating point for harmonic current injection based on motor torque and motor speed. The memory M can store controller-executable instruction sets, and the processor P can execute the controller-executable instruction sets stored in the memory M.

Figure 3:
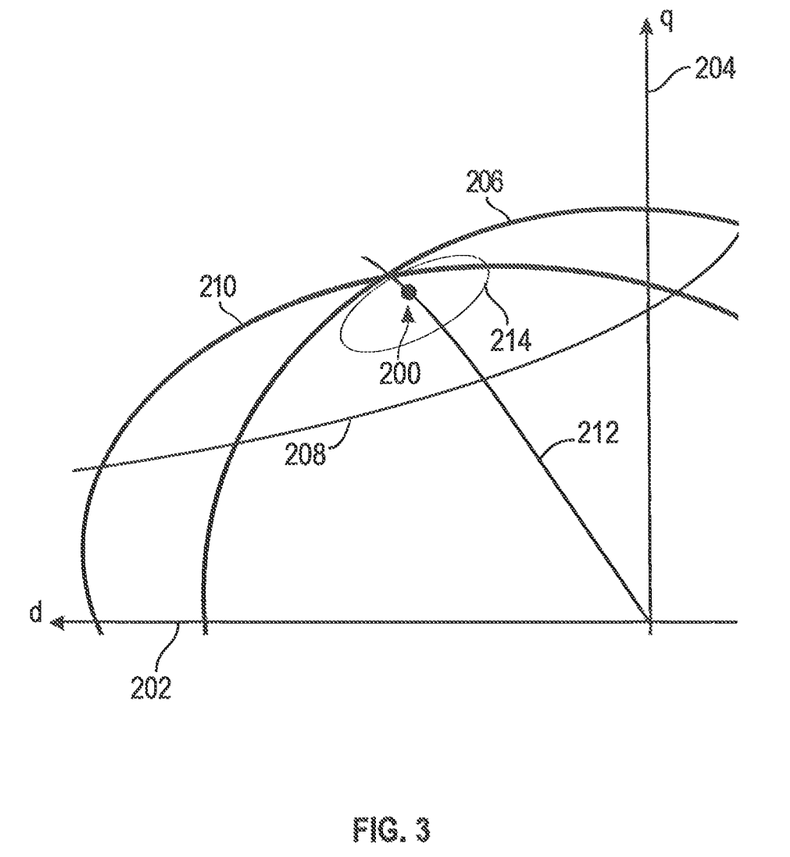
FIG. 3 is a graph showing an example operating point for harmonic injection relative to a quadrature magnetic axis (q-axis) and a direct magnetic axis (d-axis)

FIG. 3 is a graph showing an example operating point 200 for harmonic injection relative to a q-axis (vertical axis 204) and a d-axis (horizontal axis 202). Also shown in FIG. 3 is the current limit 206, a desired torque curve 208, a voltage limit represented by the voltage limit ellipse 210 and a maximum torque per ampere curve 212 (MTPA). Execution of the method 100 results in a harmonic current boundary 214 for controlling the harmonic current injection while staying under the current limit 206 and minimizing radial forces, which is analogous to minimizing torque ripple. The method 100 also minimizes loss and noise, vibration and harshness (NVH). For a $6^{th}$ order harmonic, this leads to control of both −5th and 7th order stationary reference frame currents. The harmonic current injection is constrained by the following parameters:

$$I_{dHx} = I_{d\_Hx} * \sin(Hx\theta_e + \phi_d)$$

$$I_{qHx} = I_{q\_Hx} * \cos(Hx\theta_e + \phi_q)$$

Here, $I_{dHx}$ denotes the d-axis harmonic current magnitude, $I_{qHx}$ denotes the q-axis harmonic current magnitude, $\phi_q$ denotes the q-axis harmonic phase, $\phi_d$ denotes the d-axis harmonic phase, Hx indicates the selected harmonic order and $\theta_e$ indicates the motor position. As described below, method 100 implements a control technique for independently varying the d-axis and q-axis current magnitudes ($I_{qd_{Hx}}$, $I_{qHx}$) and d-axis and q-axis phases ($\phi_d$, $\phi_q$) independently as a function of motor torque and motor speed. In other words, the propulsion system 10 optimizes and controls harmonic currents with four degrees of freedom.

Referring to FIG. 3, the desired torque curve 208, the current limit 206 and the voltage limit ellipse 210 may be obtained as described below. Each point on the desired torque curve 208 satisfies the equation below, where T is the desired torque:

$$T = \frac{3}{2}\frac{P}{2}(\lambda_d * i_q - \lambda_q * i_d).$$

Here, P is the number of pole in the electric motor 12, $i_d$ is the respective d-axis stator current, $i_q$ is the respective q-axis stator current, $\lambda_d$ is the respective d-axis magnet flux linkage and $\lambda_q$ is the respective q-axis magnet flux linkage. The desired torque (T) is based on a torque command, e.g., based on input from a user of the device 11. Each point on the current limit 206 satisfies the equation below: $[i_q^2 + i_d^2 \leq (I_{limit})^2]$. Here, $I_{limit}$ is the maximum allowable stator current, $i_d$ is the respective d-axis stator current and $i_q$ is the respective q-axis stator current.

Each point on and within the voltage limit ellipse 210 satisfies the following equation: $(R_s i_d - \omega_r \lambda_q)^2 + (R_s i_q + \omega_r \lambda_d)^2 \leq (V_{s,max})^2$. Here, $V_{s,max}$ is the maximum stator voltage, $R_S$ is the stator resistance, $\omega_r$ is the rotor speed, $i_d$ is the respective d-axis stator current, $i_q$ is the respective q-axis stator current, $\lambda_d$ is the respective d-axis magnet flux linkage and $\lambda_q$ is the respective q-axis magnet flux linkage. The maximum stator voltage may be obtained based in part on the DC link voltage ($V_{dc}$) and a predetermined constant (k), as follows:

$$\left[V_{s,max} = \frac{2}{\pi}k\, V_{dc}\right].$$

For a particular machine design, the threshold d-axis and q-axis limits may be obtained through finite element analysis, numerical simulation and other methods available to those skilled in the art.

The controller 40 of FIG. 1 is specifically programmed to execute the blocks of the method 100 (as discussed in detail below with respect to FIG. 2) and may receive inputs from one or more sensors. Referring to FIG. 1, the propulsion system 10 may include a temperature sensor 46, a magnet flux linkage observer 48, and a position sensor 50, each capable of measuring a respective physical factor and sending a respective signal to the controller 40. As alternative to physical sensors, virtual software replacements may be used. Additionally, controller 40 may be programmed to determine the respective physical factors by inputting the respective signals into a model or other estimation technique available to those skilled in the art. The propulsion system 10 may include a current sensor 52 that generates a current ripple signal. Referring to FIG. 1, a direct current (DC) power source 54 is configured to provide a DC link voltage ($V_{dc}$) to the electric motor 12. A pulse width modulated (PWM) inverter 56 may be operatively connected to the controller 40 (and the DC power source 54) and configured to convert DC current to alternating (AC) current.

Referring now to FIG. 2, an example flowchart of the method 100 is shown. Method 100 may be embodied as computer-readable code or instructions stored on and partially executable by the controller 40 of FIG. 1. Method 100 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Per block 102, the method 100 includes selecting at least one harmonic for the harmonic current command. Multiple harmonics may be selected. In one embodiment, the selected harmonic is 6 and/or 12. Advancing to block 104, the controller 40 is adapted determine if a modulation index is less than a predefined threshold value. The modulation index is the ratio of the commanded voltage to the available DC link voltage ($V_{dc}$) and is a value between zero and one. In one example, the threshold value is set to between about 0.8 to 0.9. The modulation index is selected to ensure a voltage margin for the harmonic injection.

Figure 4:
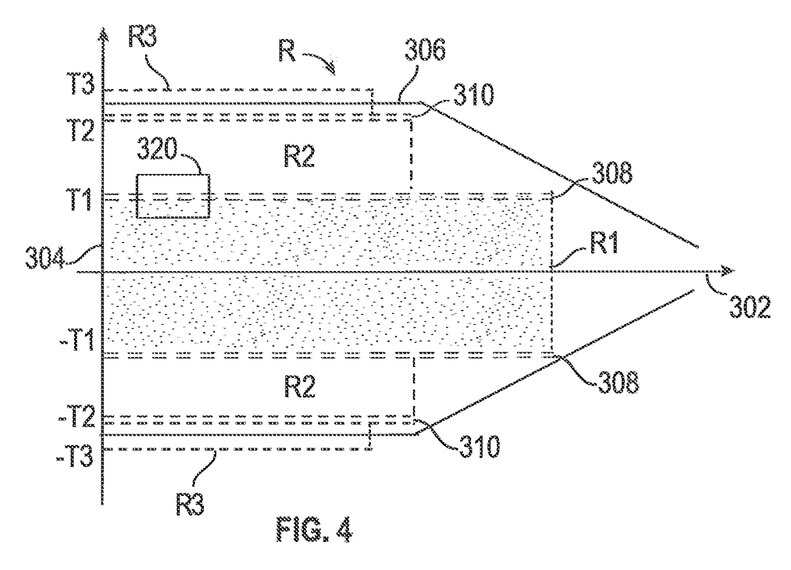
FIG. 4 is an example graph showing motor torque on the vertical axis and the speed of the electric motor on the horizontal axis.

Advancing to block 106, the controller 40 is adapted to define a plurality of operating regions R as a function of motor torque and speed, such as a first operating region R1, a second operating region R2 and a third operating region R3 shown in FIG. 4. FIG. 4 is an example graph showing motor torque on the vertical axis 304 and the motor speed on the horizontal axis 302. Trace 306 shows a theoretical motor torque of the device 11 having a magnitude (absolute value) that is relatively constant in a lower electric motor speed region and declines rapidly in a higher electric motor speed region.

Referring to FIG. 4, the first operating region R1 (T1, −T1) has a torque magnitude (absolute value) between 0 and a first torque value T1. The second operating region R2 has a torque magnitude (absolute value) between the first torque value T1 and a second torque value T2. The third operating region R3 has a torque magnitude (absolute value) between the second torque value T2 and a third torque value T3 (T1<T2<T3).

Proceeding to block 108, the method 100 includes defining a respective objective function for each of the plurality of operating regions R. The controller 40 is adapted to generate d-axis and q-axis harmonic current commands based on the respective objective functions. The controller 40 is adapted to select the respective objective function for the first operating region R1 such that a harmonic current magnitude is minimized. In other words, the parameters [$I_{d\_Hx}\ I_{q\_Hx}\ \phi_d\ \phi_d$] are commanded such that the harmonic current magnitude is at a minimum and the radial forces or radial force density are at an optimum.

The harmonic current magnitude is obtained as sqrt ($I_{d\_Hx}*I_{d\_Hx}+I_{q\_Hx}*I_{q\_Hx}$), with $I_{d\_Hx}$ denoting the d-axis harmonic current magnitude and $I_{q\_Hx}$ denoting the q-axis harmonic current magnitude. The radial force density may be represented as:

$$\left[\sigma_{rad} = \frac{B_{rad}^2 - B_{tan}^2}{2\mu_0}\right],$$

where $B_{rad}$ denotes radial flux density, $B_{tan}$ denotes tangential flux density and $\mu_0$ indicates permeability of free space.

The respective objective function for the second operating region R2 is selected such that a radial force density is minimized with no constraint on the harmonic current magnitude. Here, the parameters [$I_{d\_Hx}\ I_{q\_Hx}\ \phi_d\ \phi_d$] are commanded such that radial forces are at a minimum irrespective of the harmonic current magnitude ($I_{magHx}$). The respective objective function for the third operating region R3 is selected such that the radial force density is minimized, and the harmonic current magnitude is partially constrained. Here, the parameters [$I_{d\_Hx}$ $I_{q\_Hx}$ $\phi_d$ $\phi_d$] are commanded such that radial forces are at a minimum with a partial constraint on the harmonic current magnitude ($I_{magHx}$).

Figure 5:
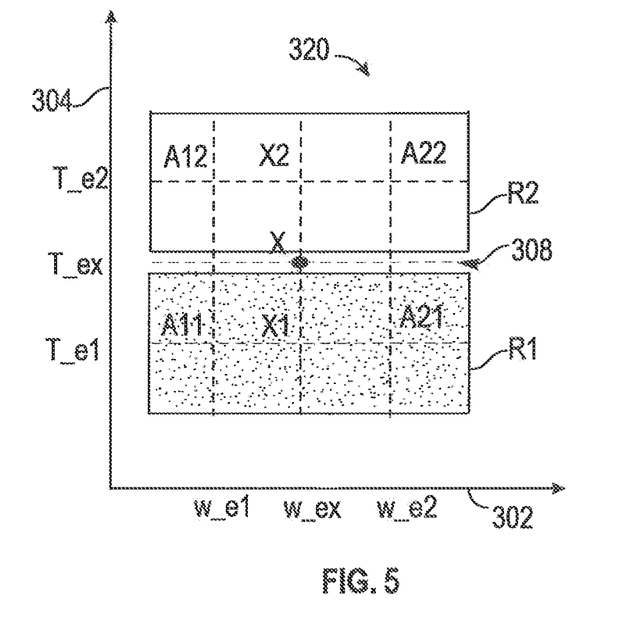
FIG. 5 is an enlargement of a portion of the graph of FIG. 4.

Advancing to block 110, the method 100 includes obtaining operating points for areas between the operating regions R, referred to herein as blending areas. FIG. 5 is an enlargement of portion 320 of FIG. 4 with the same axes 302, 304. Referring to FIGS. 4-5, a first blending area 308 is between the first operating region R1 and the second operating region R2. Referring to FIG. 4, a second blending area 310 is between the second operating region R2 and the third operating region R3. The torque (T_x) for a point X (see FIG. 4) in the first blending area 308 may be found by linearly interpolating the respective torques T_x1 and T_x2 of neighboring points $X_1$ (in the first operating region R1) and $X_2$ (in the first operating region R1) as follows:

$$T\_x = T\_x1 * \left[\frac{T\_e2 - T\_ex}{T\_e2 - T\_e1}\right] + T\_x2 * \left[\frac{T\_ex - T\_e1}{T\_e2 - T\_e1}\right]$$

$$T\_x1 = A_{11} * \left[\frac{w\_e2 - w\_ex}{w\_e2 - w\_e1}\right] + A_{21} * \left[\frac{w\_ex - w\_e1}{w\_e2 - w\_e1}\right]$$

Next, per block 112, the controller 40 is adapted to run or execute d-axis and q-axis harmonic current regulators. The harmonic current regulator may operate at a sampling frequency to harmonic frequency ratio of up to about 8, the ratio being (Fs/Hx*Fe), where Fs is the sampling frequency, Fe is the motor synchronous frequency and Hx is the harmonic order. Proceeding to block 114, the method 100 includes generating a harmonic voltage command for each selected harmonic. The harmonic current injection is constrained by the following parameters:

$I_{dHx} = I_{d\_Hx} * \sin(Hx\theta_e + \phi_d)$ $I_{qHx} = I_{q\_Hx} * \cos(Hx\theta_e + \phi_q)$ Proceeding to block 116, the harmonic voltage command is added to the fundamental voltage command. Advancing to block 118, the PWM signal is generated and applied to the PWM inverter 56. Additionally, per block 118, operation of the device 11 (via the propulsion system 10) is controlled based on the PWM signal and the method 100 ends.

Figure 6:
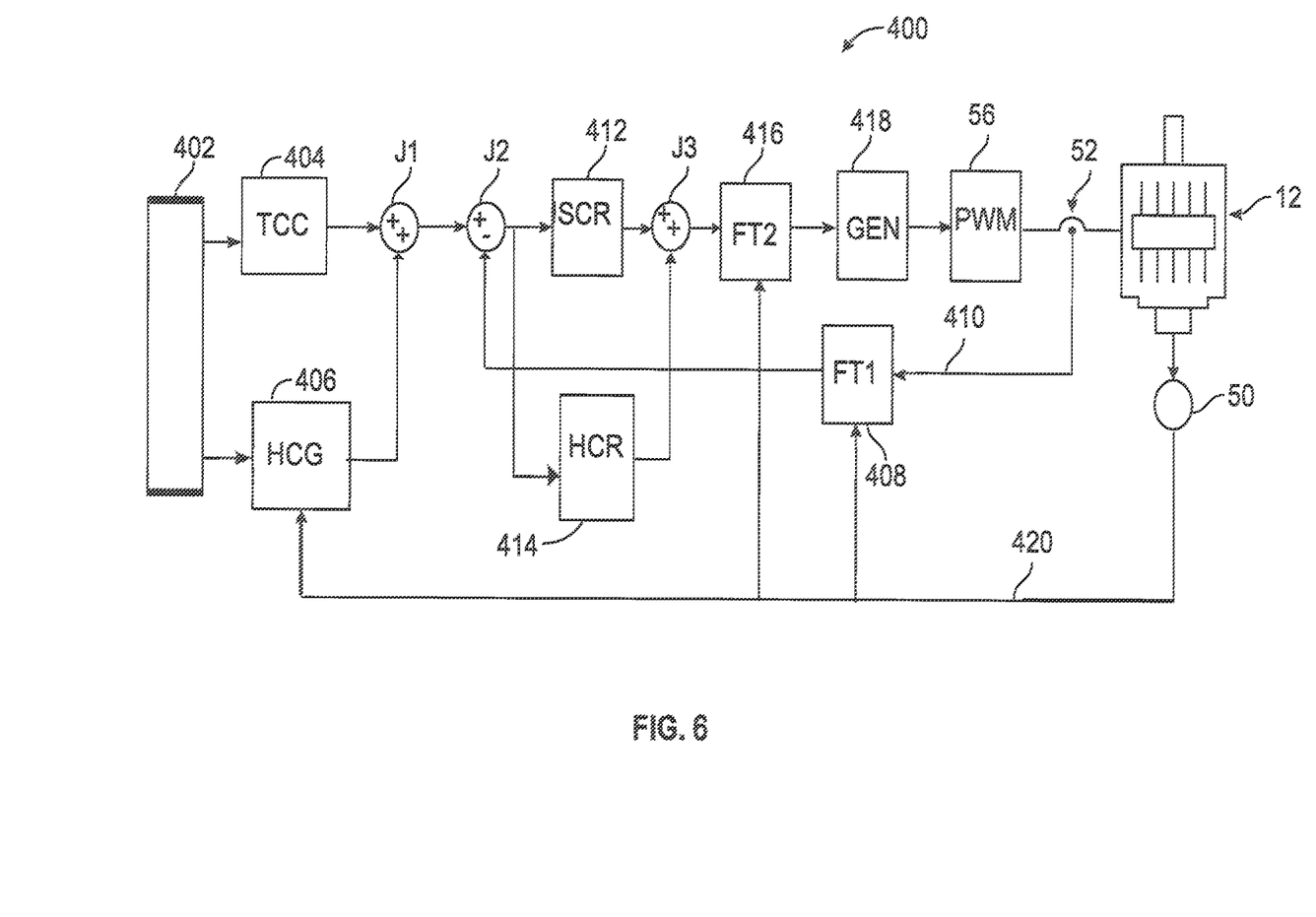
FIG. 6 is a schematic diagram of an example architecture employable by the system of FIG. 1.

An example architecture 400 employable by the system 10 is shown in FIG. 6. It is to be understood that other types of layouts or arrangements may be employed. Referring to FIG. 6, data from an input module 402 is transmitted into a torque-to-current converter 404 ("TCC") and The data includes the commanded torque, the DC voltage and the electrical speed. The torque-to-current converter 404 generates a current command ($I_{dq}^*$) based on the data and transmits it to a first summation junction J1. The data from the input module 402 is also transmitted to a feedforward harmonic current generator 406 ("HCG") which generates a harmonic current command ($I_{dqHx}^*$) and transmits it to the first summation junction J1 (for addition).

Referring to FIG. 6, a position sensor 50 and current sensor 52 are operatively connected to the electric motor 12. As shown by line 410, the measured current from the current sensor 52 is transmitted to a first frame transformer 408 for conversion from an abc frame of reference to the d-axis and q-axis frame ($I_{abc}$ to $I_{dq}$). A second summation junction J2 receives the output of the first summation junction J1 and subtracts from it the output of the first frame transformer 408. The output of the second summation junction J2 goes to a synchronous current regulator 412 (SCR) which determines the torque commands for the fundamental frequency based on the motor speed.

Referring to FIG. 6, a third summation junction J3 adds the output of the synchronous current regulator 412 ("SCR") and a harmonic current regulator 414 ("HCR"). The harmonic current regulator 414 determines a harmonic voltage command ($V_{dqHx}^*$) based on data from the second summation junction J2. The output of the third summation junction J3 is sent to a second frame transformer 416 which converts the voltage coordinates from the d-axis and q-axis frame to the abc coordinate system ($V_{dq}^*$ to $V_{abc}$) and transmits it to a PWM generator 418 ("GEN"). Data from the PWM generator 418 is sent to the PWM inverter 56 and the electric motor 12. The rotor position (based on the position sensor 50) is also transmitted to the first frame transformer 408, second frame transformer 416 and feedforward harmonic current generator 406, as shown by line 420. This example pertains to motoring operation, however, it is understood that similar principles apply when the drive system is operating in regeneration mode.

In summary, the propulsion system 10 enables optimization of harmonic currents to be within current limits and having four degrees of freedom. This approach minimizes loss while optimizing radial forces, torque ripple and noise, vibration and harshness (NVH) at peak torque operation. The method 100 enables multiple harmonics to be selected and their respective harmonic currents commanded concurrently. The method 100 may significantly reduce calibration time in a complicated system.

The controller 40 of FIG. 1 may be an integral portion of, or a separate module operatively connected to, other controllers of the device 11. The controller 40 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowchart shown in the FIGS. illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A propulsion system for a device, comprising:
   an electric motor configured to generate torque to propel the device, the electric motor having a motor speed;
   a controller in communication with the electric motor and having a processor and tangible, non-transitory memory on which instructions are recorded, the controller being adapted to select at least one harmonic order for a harmonic current command;
   wherein the controller is adapted to define a plurality of operating regions, including a first operating region, a second operating region and a third operating region each associated with a respective objective function for generating the harmonic current command;
   wherein the controller is adapted to operate the harmonic current command with four degrees of freedom by selectively varying a q-axis current magnitude, a d-axis current magnitude, a q-axis phase and a d-axis phase as a function of the torque and the motor speed; and
   wherein the harmonic current command has a d-axis component represented by $[I_{H_x}*\sin(Hx\theta_e+\phi_d)]$ and a q-axis component represented by $[I_{q\_Hx}*\cos(Hx\theta_e+\phi_q)]$, with $I_{d\_Hx}$ denoting the d-axis current magnitude, $I_{q\_Hx}$ denoting the q-axis current magnitude, $\phi_q$ denoting the q-axis phase, $\phi_d$ denoting the d-axis phase, Hx denoting the at least one harmonic order and $\theta_e$ denoting a motor position.

2. The propulsion system of claim 1, wherein the controller is adapted to select the respective objective function for the first operating region i such that a harmonic current magnitude is minimized, the first operating region extending over a lower value torque region.

3. The propulsion system of claim 2, wherein the controller is adapted to select the respective objective function for the second operating region i such that a radial force density is minimized, the second operating region extending over an intermediate value torque region.

4. The propulsion system of claim 3, wherein the controller is adapted to select the respective objective function for the third operating region i such that the radial force density is minimized, and the harmonic current magnitude is partially constrained, the third operating region extending over a higher value torque region.

5. The propulsion system of claim 4, wherein the radial force density is based in part on a radial flux density, a tangential flux density and a permeability constant of free space.

6. The propulsion system of claim 4, wherein a harmonic current magnitude is obtained as $\text{sqrt}(I_{d\_Hx}*I_{d\_Hx}+I_{q\_Hx}*I_{q\_Hx})$, with $I_{d\_Hx}$ denoting the d-axis current magnitude and $I_{q\_Hx}$ denoting the q-axis current magnitude.

7. The propulsion system of claim 1, further comprising:
   a first blended region between the first operating region and the second operating region, the controller being adapted to blend the harmonic current command between the first operating region and the second operating region.

8. The propulsion system of claim 1, wherein the controller is adapted to determine if a modulation index is less than a predefined threshold value prior to operating the harmonic current command, the modulation index being a ratio of a commanded voltage to an available DC link voltage.

9. The propulsion system of claim 1, wherein the at least one harmonic order includes a first harmonic and a second harmonic.

10. A method of operating a propulsion system in a device, the propulsion system having an electric motor configured to generate torque, and a controller having a processor and tangible, non-transitory memory, the method comprising:
    selecting at least one harmonic order for a harmonic current command, the electric motor having a motor speed;
    defining a plurality of operating regions, including a first operating region, a second operating region and a third operating region each associated with a respective objective function for generating the harmonic current command;

operating the harmonic current command with four degrees of freedom by selectively varying a q-axis current magnitude, a d-axis current magnitude, a q-axis phase and a d-axis phase as a function of the torque and the motor speed;

selecting the respective objective function for the first operating region such that a harmonic current magnitude is minimized, the first operating region extending over a lower value torque region; and selecting the respective objective function for the second operating region such that a radial force density is minimized, the second operating region extending over an intermediate value torque region.

11. The method of claim 10, further comprising:
selecting the respective objective function for the third operating region such that the radial force density is minimized, and the harmonic current magnitude is partially constrained, the third operating region extending over a higher value torque region.

12. The method of claim 10, further comprising:
representing a d-axis component of the harmonic current command as $[I_{d_{Hx}}*\sin(Hx\theta_e+\phi_d)]$ and representing a q-axis component of the harmonic current command as $[I_{q\_Hx}*\cos(Hx\theta_e+\phi_q)]$, with $I_{d\_Hx}$ denoting the d-axis current magnitude, $I_{q\_Hx}$ denoting the q-axis current magnitude, $\phi_q$ denoting the q-axis phase, $\phi_d$ denoting the d-axis phase, Hx denoting the at least one harmonic order and $\theta_e$ denoting a motor position.

13. The method of claim 10, further comprising:
obtaining a harmonic current magnitude as sqrt $(I_{d\_Hx}*I_{d\_Hx}+I_{q\_Hx}*I_{q\_Hx})$, with $I_{d\_Hx}$ denoting the d-axis current magnitude and $I_{q\_Hx}$ denoting the q-axis current magnitude.

14. The method of claim 10, further comprising:
obtaining the harmonic current command in a first blended region between the first operating region and the second operating region via linear interpolation.

15. The method of claim 10, further comprising:
including a first harmonic and a second harmonic in the at least one harmonic order.

16. A propulsion system for a device, comprising:
an electric motor configured to generate torque to propel the device, the electric motor having a motor speed;
a controller in communication with the electric motor and having a processor and tangible, non-transitory memory on which instructions are recorded, the controller being adapted to select a first harmonic and a second harmonic for a harmonic current command;
wherein the controller is adapted to define a plurality of operating regions, including a first operating region, a second operating region and a third operating region each associated with a respective objective function for generating the harmonic current command; and
wherein the controller is adapted to operate the harmonic current command with four degrees of freedom by selectively varying a q-axis current magnitude, a d-axis current magnitude, a q-axis phase and a d-axis phase as a function of the torque and the motor speed; and
wherein the controller is adapted to:
select the respective objective function for the first operating region such that a harmonic current magnitude is minimized;
select the respective objective function for the second operating region such that a radial force density is minimized with no constraint on the harmonic current magnitude; and
select the respective objective function for the third operating region such that the radial force density is minimized, and the harmonic current magnitude is partially constrained.

17. The propulsion system of claim 16, further comprising:
a first blended region between the first operating region and the second operating region, the controller being adapted to blend the harmonic current command between the first operating region and the second operating region.

* * * * *